(12) United States Patent
Davydychev et al.

(10) Patent No.: US 7,812,608 B2
(45) Date of Patent: *Oct. 12, 2010

(54) EXTRA BUCKING COILS TO BALANCE INDUCTION ARRAYS

(75) Inventors: Andrei I. Davydychev, Sugar Land, TX (US); John F. Hunka, Sugar Land, TX (US); Thomas D. Barber, Houston, TX (US); Scott S. Chesser, Richmond, TX (US); Bulent Finci, Sugar Land, TX (US); Jingjing Karen Sun, Missouri City, TX (US); William B. Vandermeer, Houston, TX (US); Richard D. Ward, LaPorte, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/562,777

(22) Filed: Sep. 18, 2009

(65) Prior Publication Data

US 2010/0026280 A1    Feb. 4, 2010

Related U.S. Application Data

(60) Continuation of application No. 12/182,194, filed on Jul. 30, 2008, now abandoned, which is a division of application No. 11/307,674, filed on Feb. 16, 2006, now Pat. No. 7,501,829.

(60) Provisional application No. 60/657,174, filed on Feb. 28, 2005.

(51) Int. Cl.
*G01V 3/28* (2006.01)
*G01V 3/18* (2006.01)

(52) U.S. Cl. ...................... 324/334; 324/338

(58) Field of Classification Search .................. 324/332, 324/333, 334, 338, 339, 344
See application file for complete search history.

(56) References Cited

U.S. PATENT DOCUMENTS

| | | | |
|---|---|---|---|
| 4,264,862 A | 4/1981 | Koelle et al. |
| 4,588,951 A | 5/1986 | Ohmer |
| 5,065,099 A | 11/1991 | Sinclair et al. |
| 5,668,475 A | 9/1997 | Orban et al. |
| 5,905,379 A | 5/1999 | Orban et al. |
| 6,557,794 B2 | 5/2003 | Rosthal et al. |
| 6,586,939 B1 | 7/2003 | Fanini et al. |

(Continued)

FOREIGN PATENT DOCUMENTS

SU    337744    5/1972

(Continued)

*Primary Examiner*—Kenneth J Whittington
(74) *Attorney, Agent, or Firm*—Dave Hofman; Shaun Sethna; Darla Fonseca

(57) ABSTRACT

An electromagnetic logging tool is disclosed that includes a support; and at least one four-coil array disposed on the support, wherein the at least one four-coil array comprises: a transmitter, a bucking coil, a receiver, and a trim coil. A method for balancing an induction array is disclosed that includes applying an alternating current to a transmitter of the induction array that comprises the transmitter, a bucking coil and a receiver; measuring a mutual coupling between the transmitter and the receiver; and adding an extra bucking coil, if the mutual coupling exceeds a selected criterion.

14 Claims, 10 Drawing Sheets

U.S. PATENT DOCUMENTS

| | | |
|---|---|---|
| 6,597,993 B2 | 7/2003 | Strickland et al. |
| 6,600,995 B2 | 7/2003 | Strickland et al. |
| 6,603,312 B2 | 8/2003 | Sinclair |
| 6,667,620 B2 | 12/2003 | Homan et al. |
| 6,690,170 B2 | 2/2004 | Homan et al. |
| 6,734,675 B2 | 5/2004 | Fanini et al. |
| 6,934,635 B2 | 8/2005 | Kennedy |
| 7,031,839 B2 | 4/2006 | Tabarovsky et al. |
| 7,042,225 B2 | 5/2006 | Barber |
| 7,190,169 B2 | 3/2007 | Fanini et al. |
| 7,417,436 B2 * | 8/2008 | Chesser et al. ............... 324/338 |
| 7,501,829 B2 * | 3/2009 | Davydychev et al. ....... 324/334 |
| 2005/0093547 A1 | 5/2005 | Xiao et al. |
| 2006/0082374 A1 | 4/2006 | Xiao et al. |

FOREIGN PATENT DOCUMENTS

| | | |
|---|---|---|
| SU | 462154 | 2/1975 |
| SU | 1080102 | 3/1984 |
| SU | 1257593 | 9/1986 |
| SU | 1744664 | 6/1992 |

* cited by examiner

EXTRA BUCKING COILS TO BALANCE INDUCTION ARRAYS

CROSS-REFERENCE TO RELATED APPLICATIONS

The present application claims priority of U.S. Provisional Patent Application Ser. No. 60/657,174 filed on Feb. 28, 2005. The Provisional Application is incorporated by reference in its entirety. This application is related to U.S. Application, titled "Selectable Tap Induction Coil", filed concurrently with this document and assigned to the present assignee. This is a continuation of U.S. patent application Ser. No. 12/182,194, filed Jul. 30, 2008, now abandoned, which is a divisional application of U.S. patent application Serial No. 11/307,674 filed Feb. 16, 2006, now issued as U.S. Pat. No. 7,501,829.

BACKGROUND OF INVENTION

1. Field of the Invention

The invention relates generally to electromagnetic (EM) well logging. In particular, embodiments of the present invention relate to methods and apparatus for improving EM well logging sensitivities.

2. Background Art

During the exploration and production of oil and gas, many well logging techniques are deployed to log data of the geological formations. The data contain information that can be used to locate subsurface hydrocarbon reservoirs and to determine types and quantities of subsurface hydrocarbons. In such logging processes, a tool may be lowered into a borehole traversing a subsurface formation, either after the well has been drilled or during the drilling process. A typical logging tool includes a "sonde", that emits, for example, acoustic or EM waves to interact with the surrounding formation. The signals produced from such interactions are then detected and measured by one or more sensors on the instrument. By processing the detected signals, a profile or log of the formation properties can be obtained.

Logging techniques known in the art include "wireline" logging, logging-while-drilling (LWD), measurement-while-drilling (MWD), and logging-while-tripping (LWT). Wireline logging involves lowering an instrument into an already-drilled borehole at the end of an electrical cable to obtain measurements as the instrument is moved along the borehole. LWD and MWD involve disposing an instrument in a drilling assembly for use while a borehole is being drilled through earth formations. LWT involves disposing sources or sensors within the drill string to obtain measurements while the string is being withdrawn from the borehole.

FIG. 1 shows a general illustration of a typical drilling rig with a drill string carrying a downhole logging tool in a borehole. The rotary drilling rig shown in FIG. 1 comprises a mast 1 rising above the ground 2 and is fitted with a lifting gear 3. The lifting gear 3 has a crown block 7 fixed to the top of the mast 1, a vertically traveling block 8 with a hook 9 attached, a cable 10 passing around blocks 7 and 8 to form on one side a dead line 10a anchored to a fixed point 11 and on the other side an active line 10b that winds round the drum of a winch 12. A drill string 4 formed of several segments of hollow drilling pipes connected end-to-end is suspended from the hook 9 by means of a swivel 13, which is linked by a hose 14 to a mud pump 15. The mud pump 15 pumps drilling mud into the well 6, via the hollow pipes of the drill string 4 and out of the bit 5 to float the rock cuttings out of the well 6. The drilling mud may be drawn from a mud pit 16, which may also be fed with surplus mud from the well 6. The drill string 4 may be elevated by turning the lifting gear 3 with the winch 12. When raising or lowering drill pipes, the drill string 4 needs to be temporarily unhooked from the lifting gear 3, during which the weight of the string 4 is supported by wedges 17. The wedges 17 are anchored in a conical recess 18 in a rotating table 19 that is mounted on a platform 20. The lower portion of the drill string 4 may include one or more instruments 30 for investigating downhole drilling conditions or for investigating the properties of the geological formations. In the case of sonic logging, the instrument 30 may include at least one transmitter and a plurality of receivers.

Variations in the height h of the traveling block 8 during the raising cycle of the drill string operations are measured by means of a sensor 23 which may be an angle-of-rotation sensor coupled to the faster pulley of the crown block 7. The weight applied to the hook 9 may also be measured by means of a strain gauge 24 inserted into the dead line 10a of the cable 10 to measure its tension. Sensors 23 and 24 are connected by lines 25 and 26 to a processing unit 27 having a clock incorporated therein. A recorder 28 is connected to the processing unit 27, which is preferably a computer. In addition, the downhole tool 30 may include a processing unit 30a. The downhole processing unit 30a and/or the surface processing unit 27, which may include a memory, may be used to perform the data analysis and determination of formation properties.

For downhole tools, EM logging tools are among the widely used. EM logging tools are implemented with antennas that are operable as transmitters and/or receivers.

The antennas are typically solenoid coils. Referring to FIG. 2, a coil 211 is shown comprising of insulated conducting wires having one or more turns wound around a support 214. During operation, the coil 211 may function as a transmitter antenna when it is energized with an alternating current or an oscillating electrical signal 212. The transmitter antenna emits EM waves through the borehole mud and into the surrounding earth formation. The coil 211 may also function as a receiver antenna that collects EM signals carrying information about the interactions between the EM waves and the mud/formation.

The coil 211 carrying a varying current 212 will produce a magnetic dipole having a magnetic moment. The strength of the magnetic moment is proportional to the electric current in the wire, the number of turns of the wire, and the area encompassed by the coil. The direction and strength of the magnetic moment can be represented by a vector 213 in a direction parallel to the longitudinal axis of the coil. In conventional induction logging instruments, the transmitter and receiver antennas are mounted with their axes aligned with the longitudinal axis of the instrument. Thus, these tools are implemented with antennas having longitudinal magnetic dipoles (LMD). When an LMD antenna is placed in a borehole and energized to transmit EM energy, the induced electric currents flow around the antenna in the borehole and in the surrounding earth formations, and no net current flows up or down the borehole.

Recent EM well logging tools have tilted or transverse coils, i.e., the coil's axis is not parallel with the longitudinal axis of the support. Consequently, the antenna has a transverse or tilted magnetic dipole (TMD). The TMD configuration permits a tool to have a three-dimensional evaluation capability, such as information about resistivity anisotropy or locations and orientations of dips and faults. In addition, directional sensitivity of the data can be used for directional drilling. Logging instruments equipped with TMD-antennas have been described in U.S. Pat. Nos. 6,147,496, 4,319,191, 5,757,191, and 5,508,616. Under certain conditions, a TMD-antenna may cause a net current to flow up or down the borehole. Some TMD-antennas are configured with multiple coils. For example, a particular TMD-antenna design includes a set of three coils, and such an antenna is known as a triaxial antenna.

In wireline applications, the antennas are typically enclosed in a housing made of tough non-conductive materials such as a laminated fiberglass material. In LWD applications, the antennas are generally encased into a metallic support so that it can withstand the hostile environment and conditions encountered during drilling. Alternatively, logging instruments may be made of composite materials, thus, providing a non-conductive structure for mounting the antennas. U.S. Pat. Nos. 6,084,052, 6,300,762, 5,988,300, 5,944,124, and UK Patent GB 2337546 disclose examples of composite-material-based instruments and tubulars for oilfield applications.

Induction logging is a well-known form of EM logging. In this type of logging, induction tools are used to produce a conductivity or resistivity profile of earth formations surrounding a borehole. U.S. Pat. Nos. 3,340,464, 3,147,429, 3,179,879, 3,056,917, and 4,472,684 disclose typical well logging tools based on induction logging.

A conventional induction logging tool or "sonde" may include a transmitter antenna and a receiver antenna. Note that the designation of a transmitter and a receiver is for clarity of illustration. One skilled in the art would appreciate that a transmitter may be used as a receiver and a receiver may also be used as a transmitter depending on the application. Each antenna may include one or more coils, and may be mounted on the same support member or on different support members, i.e., the transmitter antenna and the receiver antenna may be on different tool sections. The antennas are axially spaced from each other in the longitudinal direction of the tool.

In use, the transmitter antenna is energized with an alternating current. This generates an EM field that induces eddy currents in the earth formation surrounding the borehole. The intensity of the eddy currents is proportional to the conductivity of the formation. The EM field generated by the eddy currents, in turn, induces an electromotive force in one or more receiving coils. Phase-locked detection, amplification, and digitization of this electromotive force signal determines the amplitude and the phase of the voltage on the receiver coil. By recording and processing the receiver voltages, an earth formation conductivity profile can be obtained. U.S. Pat. No. 5,157,605 discloses an induction array well logging tool used to collect the voltage data.

In principle, a conductivity profile may be obtained by simply measuring the voltages on the receiver. In practice, the receiver voltages are not only affected by "true" signals traveling through the formation, but are also affected by a direct coupling between the transmitter and the receiver. It is well known that the sensitivity of measurements obtained from induction-type loggings are adversely affected by the direct transmitter-to-receiver couplings (mutual couplings).

Mathematically, the amplitude and phase of the received signal voltage may be expressed as a complex number (i.e., a phasor voltage). Accordingly, the apparent conductivity $\sigma_a$ (as measured by a receiver induction array) is expressed in terms of its real and imaginary parts, $\sigma_a = \sigma_R + i\sigma_X$. The real part $\sigma_R$ represents the true signal from the earth formation, while the imaginary part $\sigma_X$ includes direct coupling that may be several orders of magnitude larger than the value of $\sigma_R$, when the array is unbalanced. This can be seen from a well-known formula describing the conductivity measured by a two-coil (one transmitter and one receiver) array, when the transmitter is simplified as a point dipole, $$\sigma_a = \sigma_R + i\sigma_X = -\frac{2i}{\omega\mu} \frac{(1-ikL)e^{ikL}}{L^2}, \qquad (1)$$

where $\omega$ is the frequency, $\mu$ is the magnetic permeability of a (homogeneous) medium, $k^2 = i\omega\mu\sigma$, $\sigma$ is the conductivity of the medium, and L is the transmitter-receiver spacing. Defining a skin depth as $\delta = \sqrt{2/(\omega\mu\sigma)}$ (so that $k=(1+i)/\delta$) and expanding $\sigma_a$ using the powers of $L/\delta$, one obtains:

$$\sigma_R + i\sigma_X = \sigma - \frac{2i}{\omega\mu L^2} - \frac{2L\sigma}{3\delta}(1-i) + O(L^2/\delta^2) \qquad (2)$$

The first term on the right-hand side of Eq. (2) is the formation conductivity $\sigma$ of interest. The second term, $-2i/(\omega\mu L^2)$, contributes to $\sigma_X$ only. It does not depend on $\sigma$ and corresponds to the direct mutual transmitter-receiver coupling that exists in the air. An out-of-balance induction array can have a very large value of $\sigma_X$, especially when L is small. Therefore, in order for an induction tool to achieve a high sensitivity, the induction array must be balanced to reduce the value of $\sigma_X$.

As illustrated in FIG. 3, an induction-type logging instrument 300 typically includes a "bucking" coil 311 in order to eliminate or reduce direct coupling between the transmitter 312 and the main receiver 313. The purpose of having two receiver coils, the main coil 313 and the bucking coil 311, in a balanced configuration is to cancel the transmitter-main-coil coupling using the transmitter-bucking-coil coupling. The bucking coil 311 may be placed between the transmitter 312 and the main coil 313. Practical induction arrays have always been mutually-balanced using a bucking coil. This is necessitated by the fact that the direct coupling between a transmitter and a receiver is usually several orders of magnitude stronger than the true signals, the latter being strongly attenuated when traveling through the earth formation. The instrument's 300 longitudinal axis is represented as a dashed line in FIG. 3.

The minimum configuration for a mutually-balanced array is a three-coil array as illustrated in FIG. 3, including a transmitter 312 (T), a main receiver 313 ($R_1$) and a bucking coil 311 ($R_2$). In order to balance the array, the locations of the main receiver and bucking coils ($z_{main}$ and $z_{buck}$) and the numbers of turns in these coils ($N_{main}$ and $N_{buck}$) are chosen such that the sum of their responses is close to zero in the air. That is, the voltages on the two receiver coils satisfy the relation: $V_{R1} + V_{R2} = 0$, in the air. Consequently, the responses from a logging operation will be the sum of the T–$R_1$ coupling responses and the T–$R_2$ coupling responses.

In theory, the required positions of the receiver coils can be calculated with high precision, even when the transmitter is a finite-size solenoid. In practice, all geometrical parameters, such as the positions ($z_{buck}$ and $z_{main}$) and the radii ($r_{trans}$, $r_{buck}$, and $r_{main}$) of the coils, have finite ranges of variations. The direct mutual couplings T–$R_1$ and T–$R_2$ are very sensitive to even minute changes in some of the geometrical parameters, and, therefore, large variations in measured signals may result from small errors or variations in, for example, the radii of the coils. Therefore, when an EM tool is manufactured, the configuration of the coils may need to be further adjusted from the calculated configuration. In a practical configuration, both positions of the bucking coil and the main receiver coil ($z_{buck}$ and $z_{main}$) relative to the position of the transmitter (z=0) would need to be carefully adjusted with a high degree of precision in order to minimize direct mutual couplings. Such balancing or adjusting could be very difficult and demanding.

One prior art method of fine-tuning the antenna is to use moveable coils so that the locations of the coils (e.g., the main receiver or bucking coils) may be altered to minimize the direct coupling. For example, if the direct coupling (reflected as residual $\sigma_X$) for a particular array is substantial, it can be minimized (or reduced to zero) by altering the location of an antenna, such as the bucking coil $z_{buck}$. However, as a practical matter, it is preferred that the tool or antenna has no moving parts.

An alternative method for balancing the array is to add a conductive loop near one of the coils (e.g., the receiver coil) to permit fine adjustment. Another approach is to adjust with the number of turns in the bucking coil. However, this approach is often impractical because removing or adding a single turn in a coil may produce large changes in $\sigma_X$. This is especially true when the distance between the bucking coil and the transmitter coil is short. Therefore, there still exists a need for new approaches to balancing induction arrays.

SUMMARY OF THE INVENTION

One aspect of the invention relates to electromagnetic logging tools. An electromagnetic logging tool in accordance with one embodiment of the invention includes a support; and at least one four-coil array disposed on the support, wherein the at least one four-coil array comprises: a transmitter, a bucking coil, a receiver, and a trim coil.

Another aspect of the invention relates to methods for balancing an induction array. A method for balancing an induction array in accordance with one embodiment of the invention includes applying an alternating current to a transmitter of the induction array that comprises the transmitter, a bucking coil and a receiver; measuring a mutual coupling between the transmitter and the receiver; and adding an extra bucking coil, if the mutual coupling exceeds a selected criterion.

Other aspects and advantages of the invention will become apparent from the following description and the attached claims.

DETAILED DESCRIPTION

Figure 1:
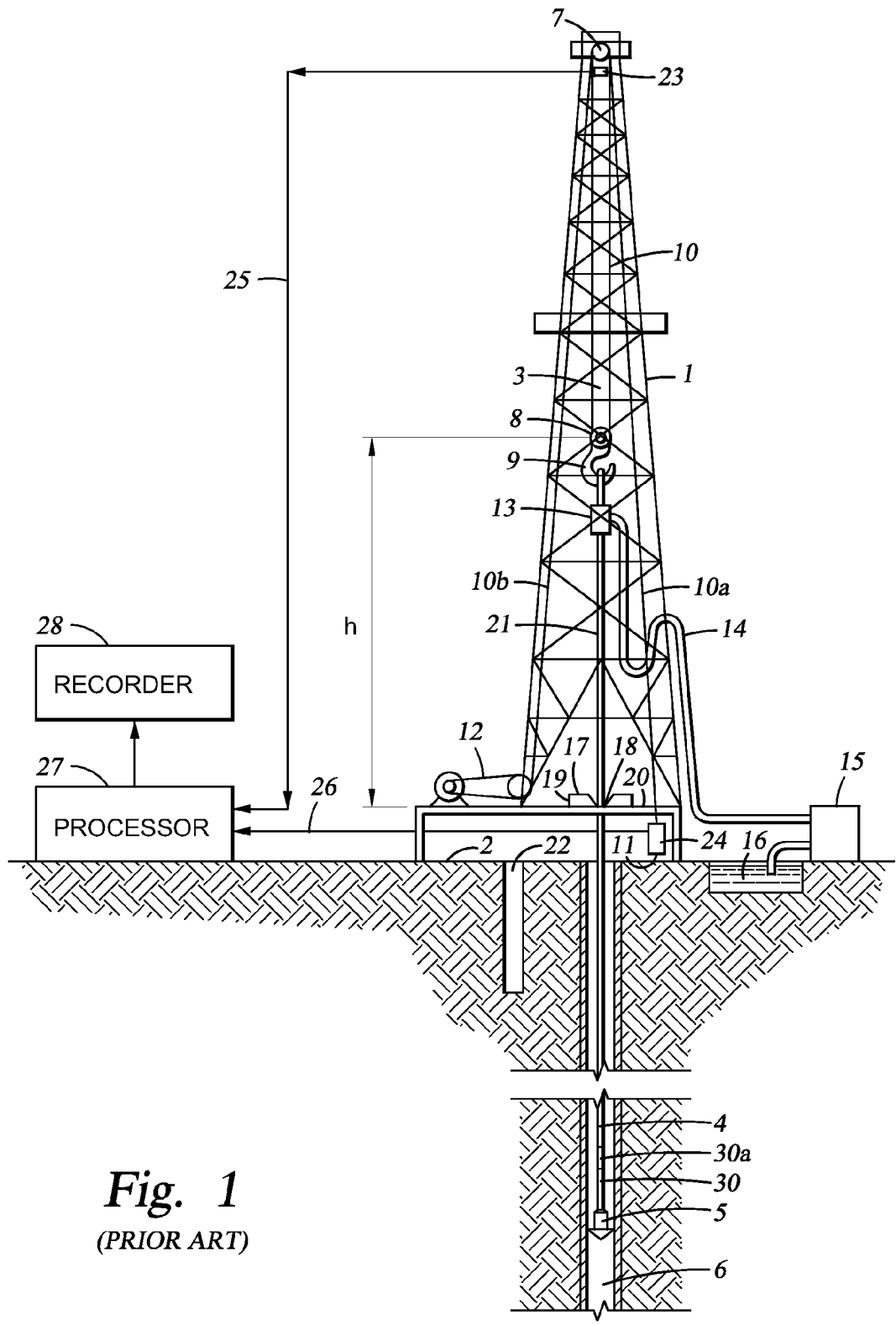
FIG. 1 illustrates a conventional drilling rig and a drill string with a downhole logging tool in a borehole.
Figure 2:
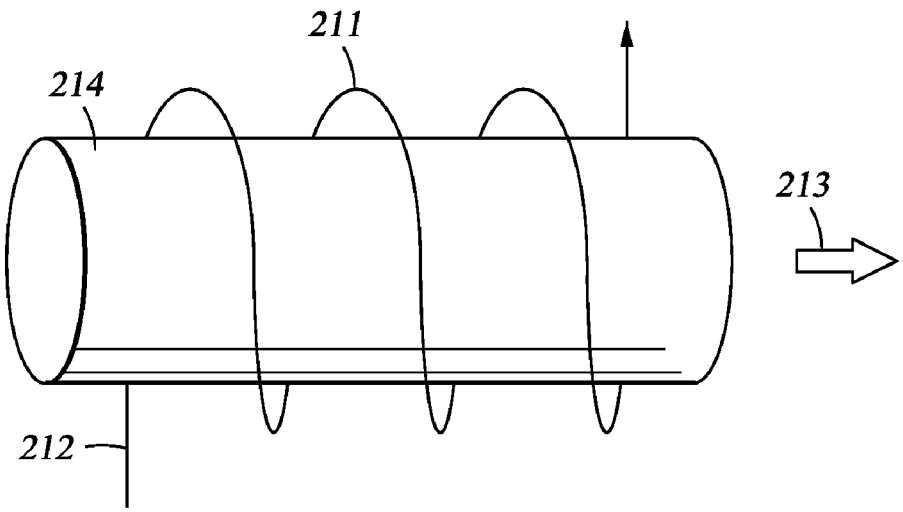
FIG. 2 shows schematic illustrating a structure of a conventional magnetic coil.
Figure 3:
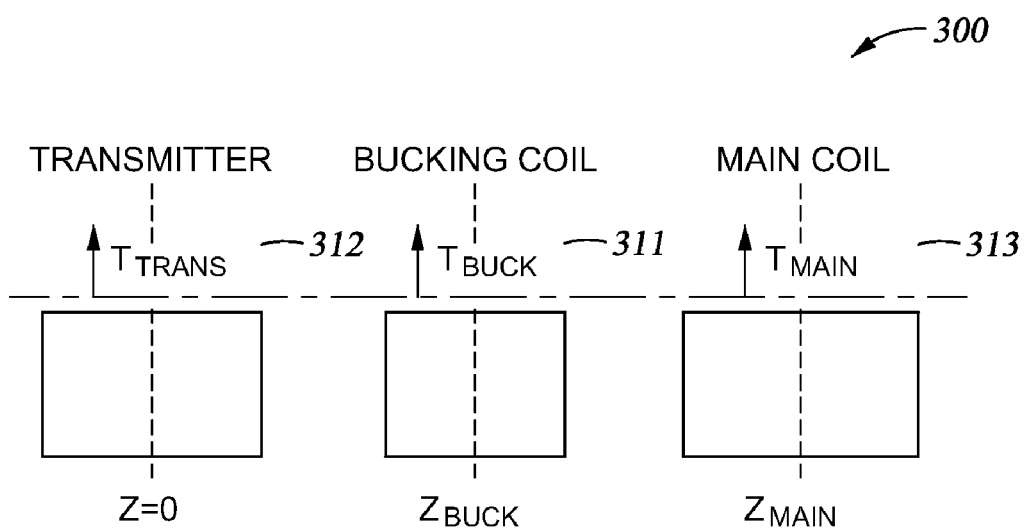
FIG. 3 illustrates a prior art three-coil antenna.

Embodiments of the invention relate to a new approach to balancing induction arrays such that the mutual couplings between the transmitter and receivers can be effectively removed. As noted above, mutual couplings (as reflected in $\sigma_X$) between the transmitter and receiver can be several orders of magnitude larger than the signals that return from the formation.

Embodiments of the invention use extra bucking coils (or trim coils) to provide further balancing such that the receivers in the induction arrays will have significantly lower $\sigma_X$ signals. Such tool will be able to provide more accurate and/or more sensitive measurements under a wide range of conditions. The extra bucking coils should be designed to be more controllable to provide fine balancing of the arrays. Note that for clarity of description, the following will use transmitters, bucking coils, receivers (or main receivers), and extra bucking coils (or trim coils) to describe four-coil arrays in accordance with embodiments of the invention. One of ordinary skill in the art would appreciate that these different terms are intended to describe their different functions and these antennas/coils may have same or similar physical structures. Further, extra bucking coils and trim coils are considered synonymous and will be used interchangeably in the following description.

When a transmitter and a receiver are treated as point dipoles, the mutual couplings between them vary with the spacing between them according to a function of $1/L^3$ (an extra power of $1/L$ coming from the $1/L$-dependence of the tool factor K). Therefore, the balancing condition of an induction array is met when $$\frac{M_{main}}{L_{main}^3} + \frac{M_{buck}}{L_{buck}^3} = 0,$$

where $M_{main}$ and $M_{buck}$ are magnetic moments of the main and bucking coils. If all coil turns have the same geometry, then $M_{main}$ and $M_{buck}$ equal $M_0 N_{main}$ and $M_0 N_{buck}$, respectively, where $M_0$ is the magnetic moment of a single turn. Therefore, the balance condition is met when $$\frac{N_{main}}{L_{main}^3} + \frac{N_{buck}}{L_{buck}^3} = 0. \tag{3}$$

To satisfy this condition, the two terms on the left side of Eq. (3) are of the opposite signs. This condition can be achieved by winding the wires of the bucking and main receiver coils in the opposite directions. The $1/L^3$-dependence of the mutual couplings suggest that shorter arrays will be significantly more sensitive to spacing (L) variations. In other words, minor spacing changes will have a much larger impact on the accuracy of the shorter arrays. Likewise, any external factors, such as temperature and pressure, that may affect the accuracy of the array would also have more impact on the accuracy of the shorter arrays. As a result, shorter arrays typically require larger error specifications.

For example, Table 1 below shows the impact of small changes of various parameters on a three array tool, which includes a Shallow Array (SA), a Medium Array (MA), or a Deep Array (DA). Results in Table 1 show changes in $\sigma_R$ and $\sigma_X$ (in units of mS/m) for these arrays with respect to changes in the locations and radii of the transmitter, the bucking receiver and the main receiver, as well as changes in coil diameters (or radii), mandrel diameters (or radii), and numbers of turns of the bucking or main receiver coil.

TABLE 1

Sensitivity of $\sigma_R$ and $\sigma_X$ (in mS/m) to changes of geometrical parameters and numbers of turns.

| Parameter | Change | $\sigma_R$ (SA) | $\sigma_X$ (SA) | $\sigma_R$ (MA) | $\sigma_X$ (MA) | $\sigma_R$ (DA) | $\sigma_X$ (DA) |
|---|---|---|---|---|---|---|---|
| $z_{main}$ | 0.001" | −0.08 | 36.68 | −0.005 | 5.48 | 0.0003 | 0.65 |
| $z_{buck}$ | 0.001" | 0.20 | −59.76 | 0.018 | −9.86 | −0.0004 | −0.91 |
| $r_{trans}$ | 0.001" | 0.07 | −1.34 | 0.005 | −0.17 | −0.007 | −0.05 |
| $r_{main}$ | 0.001" | −41.91 | −895.44 | −11.71 | −244.06 | −3.35 | −66.08 |
| $r_{buck}$ | 0.001" | 41.09 | 888.35 | 11.51 | 242.59 | 3.26 | 65.48 |
| all coil radii | 0.001" | 0.14 | −2.68 | 0.009 | −0.35 | −0.015 | −0.097 |
| $r_{mandrel}$ | 0.001" | −0.006 | −16.37 | −0.006 | −3.33 | 0.012 | −0.08 |
| $N_{buck}$ | 1 turn | −7.6 | 2635 | −1.62 | 1128 | 0.035 | 57.3 |
| $N_{main}$ | 1 turn | 1.9 | −669 | 0.29 | −199 | −0.013 | −20.4 |

As noted above, mutual couplings vary with $1/L^3$ (L is the spacing between the transmitter and the receiver), which includes the K-factor of the tool that varies as $1/L$. Therefore, it is expected that the shallow array (SA) is the most sensitive to changes in positions ($z_{main}$ and $z_{buck}$), while the deep array (DA) is the least sensitive. Results in Table 1 also show that minor changes in the radii of the main receiver or bucking coils can result in huge changes in $\sigma_X$. These dramatic changes due to radius variations may arise from radius mismatch between the main and bucking coils. In addition, there may also be effects related to slight eccentricity of the coils, etc. Therefore, it is desirable to have some way to correct for these effects when manufacturing the instrument.

Table 1 also shows that a single turn change in the number of turns in the bucking or main receivers have a significant impact on the sensitivity of the $\sigma_X$ signals. The effect is more significant with the shallow array (SA) than with the deep array (DA). These results indicate that it would be difficult (if not impossible) to balance an array by changing the number of turns of a bucking coil, especially the bucking coil of an SA.

In view of the above, embodiments of the invention use an extra bucking coil to provide more controllable balancing of an induction array. The extra bucking coils (or trim coils) are preferably disposed farther away (compared to the main receiver or bucking coil) from the transmitter so that the additional bucking coil would be more controllable than the conventional bucking coil.

The farther the trim coil is from the transmitter, the less is its sensitivity to various factors that influence mutual couplings, such as the number of turns of coils, locations, and radii. Thus, a trim coil with a longer spacing from the transmitter can provide better controllability. An ideal solution is to find a location where the trim coil would contribute a desirable amount of effect to the mutual couplings between the transmitter and the receiver, so that $\sigma_x$ of the main receiver can be brought reasonably close to zero.

In accordance with embodiments of the invention, after the induction antenna coils (the transmitter, the receiver main coil and the first bucking coil) are wound, the mutual couplings are measured. Theoretically, for integer values of $N_{main}$ and $N_{buck}$, it is possible to find $L_{main}$ and $L_{buck}$ to satisfy the condition in Equation (3) with any precision. However, in practice, the sum of the two terms on the left-hand side of Equation (3) will be non-zero due to finite tolerance. Let's assume the experimentally determined mutual coupling is $\Delta_{exp}$:

$$\left[\frac{N_{main}}{L_{main}^3} + \frac{N_{buck}}{L_{buck}^3}\right]_{exp} = \Delta_{exp}.$$

The residual mutual couplings may be reduced close to zero by adding trim coils in such a way that $N_{trim}/L_{trim}^3 = -\Delta_{exp}$ (or as close to $-\Delta_{exp}$ as possible). Therefore, we get:

$$\left[\frac{N_{main}}{L_{main}^3} + \frac{N_{buck}}{L_{buck}^3} + \frac{N_{trim}}{L_{trim}^3}\right]_{exp} = 0.$$

The above analysis can be extended to more than one trim coils, which could be located at increasing spacings to provide fine tuning.

Figure 4:
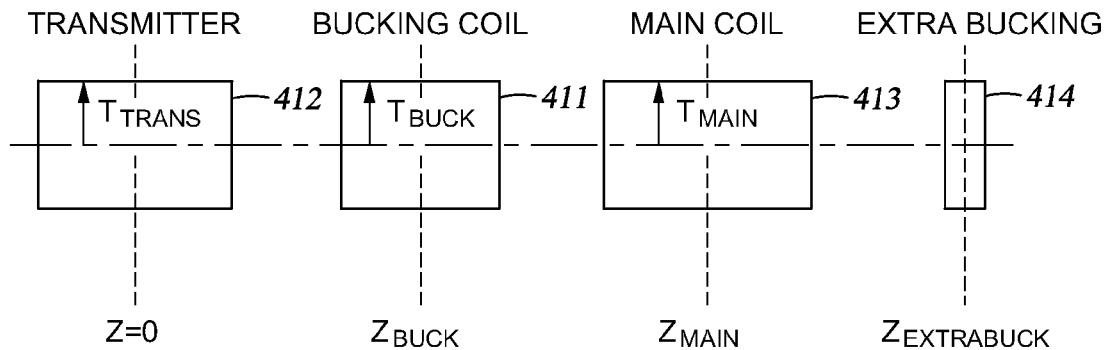
FIG. 4 shows a four-coil antenna array in accordance with one embodiment of the present invention.

By adding a trim coil, the system becomes a four-coil array. In preferred embodiments, the trim coil is further away from the transmitter than is the main coil. A configuration of a four-coil array, including a transmitter 412, a bucking coil 411, a main receiver coil 413, and an extra bucking coil (trim coil) 414, is illustrated in FIG. 4.

In accordance with one embodiment of the invention, when making such an antenna array, the main and the bucking coils are first wound, then mutual coupling between the transmitter and the receiver (as reflected in $\sigma_X$) in the air is measured. Based on this measurement, the location and the number of turns of the extra bucking coil can be determined such that it can bring the value of $\sigma_X$ as close to zero as possible (or within a tolerance range). After the number of turns is determined, the extra bucking coil is wound and the tool is then overwrapped to protect the coils.

Figure 5A:
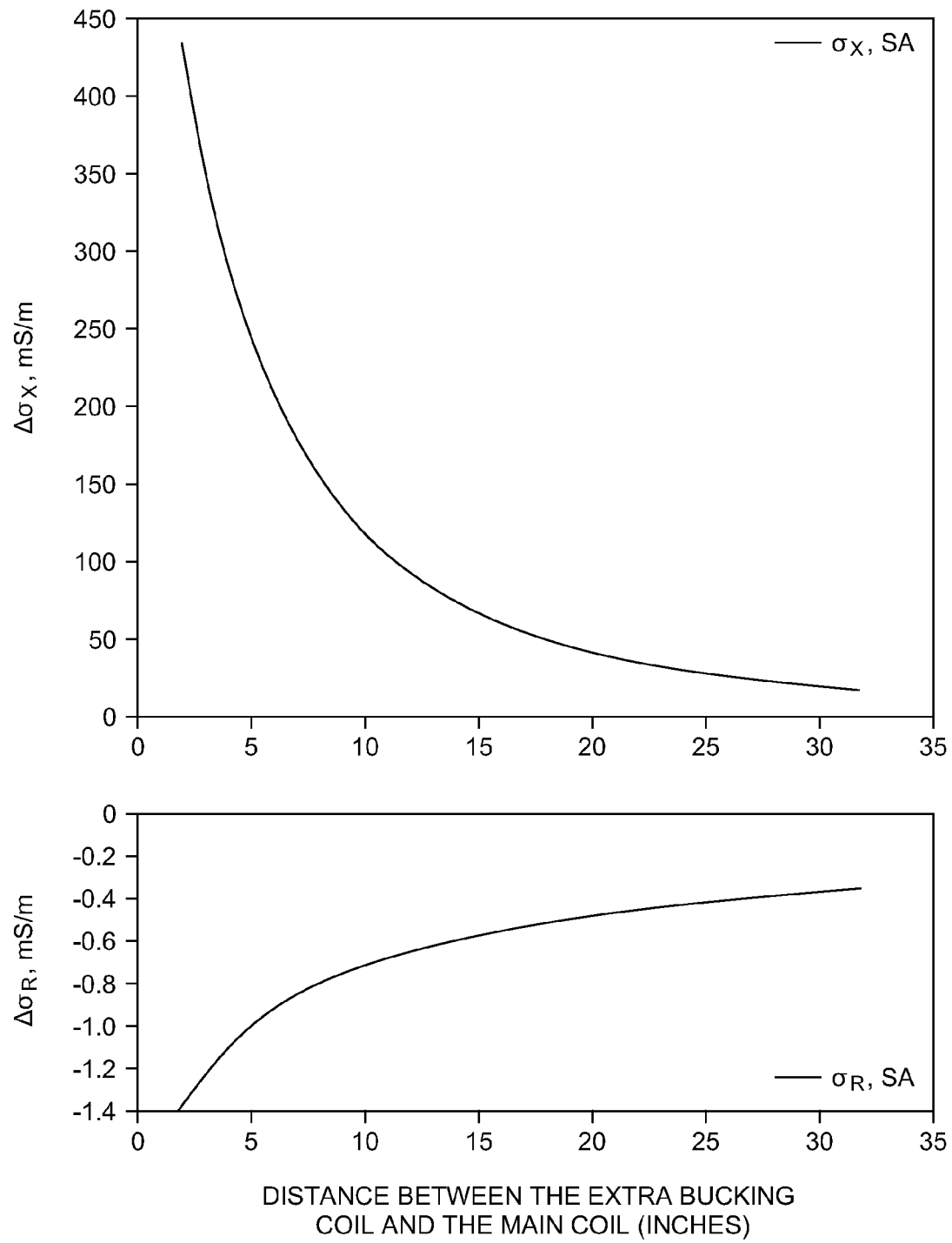
FIG. 5A-5C illustrate sensitivities of $\sigma_X$ and $\sigma_R$ to one extra turn of bucking coil in different positions of an SA (shallow array), an MA (medium array), and a DA (deep array), respectively, in accordance with one embodiment of the invention.
Figure 5B:
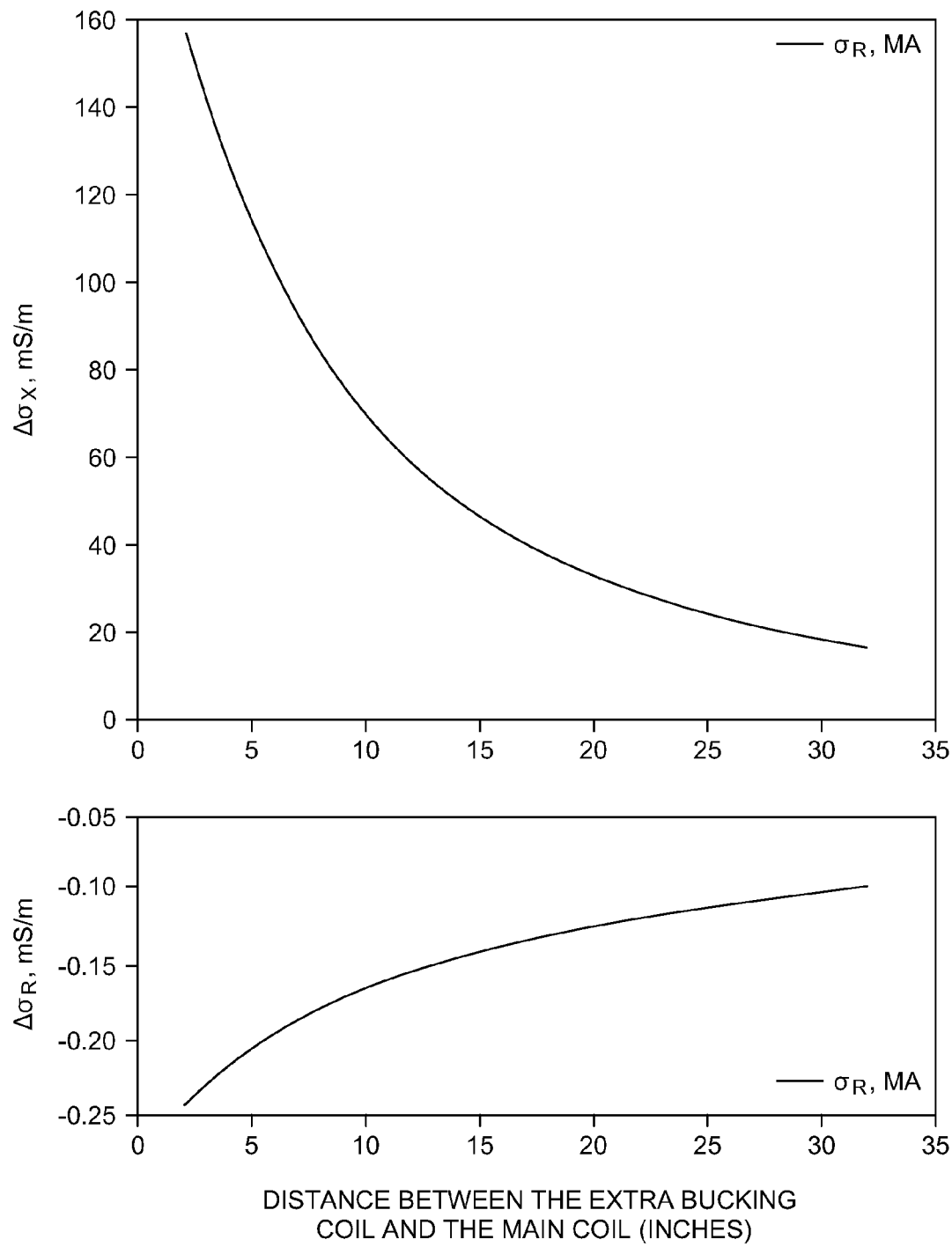
Figure 5C:
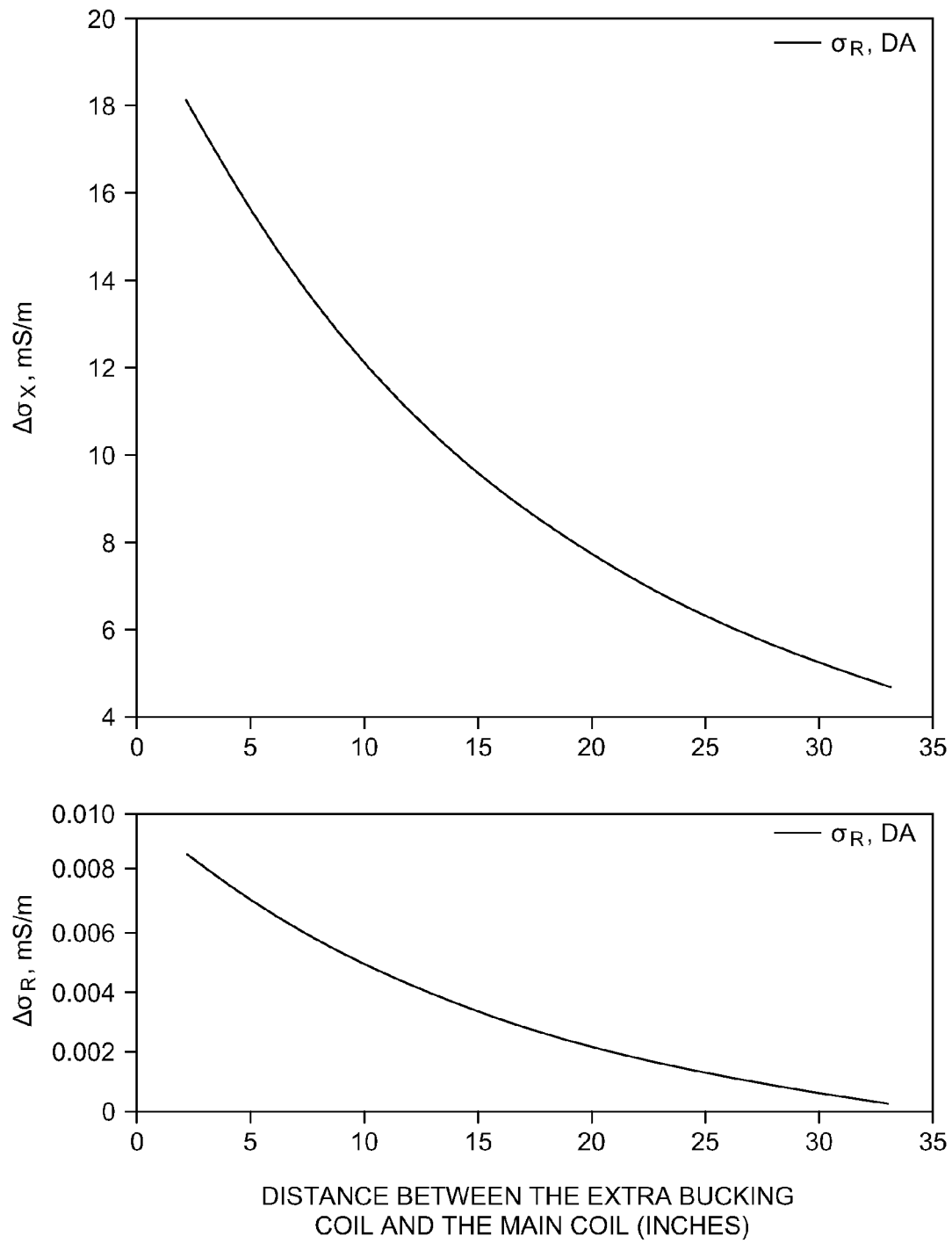

The sensitivity of one turn of a trim coil at different spacings from the main receiver is shown in FIGS. 5A-5C, for SA, MA and DA. Both the $\sigma_R$ and $\sigma_X$ changes are shown. For example, as shown in FIG. 5A, for SA, one turn of the trim coil at 6" spacing from the main receiver introduces about 200 mS/m change in $\sigma_X$. If the array without this extra bucking coil has a value of, for example, $\sigma_X = \pm 1250$ mS/m in the air, then one would need ±6 turns (the sign depends on the direction of windings) to reduce it to 50 mS/m. In this way, the resulting $\sigma_X$ can be brought to within ±100 mS/m, which is half of the one turn contribution. Similar considerations are also applicable to the longer arrays (MA and DA). For example, for MA, one turn of a trim coil at 11" spacing from the main receiver can alter the $\sigma_X$ by about 60 mS/m, and for DA, one turn of the trim coil at 4" spacing from the main receiver would contribute about 12 mS/m to the $\sigma_X$.

The above theoretical calculation has been verified by several tools, which have been used to experimentally measure array characteristics and performances. Two of these sondes (designated as A and B), each containing a shallow array (SA), have been used to test the extra bucking coil in accordance embodiments of the present invention. Both sondes have high direct-coupling errors that would benefit from using the extra coil. The sonde errors are measured and are determined if an extra bucking coil is needed. In the case of these sondes, an extra bucking coil was added a few inches from the main receiver coil and the appropriate number of turns are wound. Measured sonde errors, before and after adding the trim coil, are tabulated in Table 2.

TABLE 2

Sonde errors before and after addition of an extra bucking coil.

| Sonde | Initial Sonde Error (mS/m) | | Sonde Error With Trim Coil (mS/m) | |
|---|---|---|---|---|
| | $\sigma_R$ | $\sigma_X$ | $\sigma_R$ | $\sigma_X$ |
| A | −161 | 1308 | −149 | −184 |
| B | −106 | 2213 | −116 | 274 |

It is apparent from Table 2 that the extra bucking coil is very effective in balancing the arrays. The actual amount $\sigma_X$ contributed by the extra bucking coil is very close to the theoretical modeling results.

The above description shows that it is possible to reduce the undesire $\sigma_X$ of a main receiver by an extra bucking coil (trim coil). However, for this approach to be useful, the extra bucking coil should not degrade (or at least only minimally affect) the performance (such as vertical resolution) of the original array. Understanding how an extra bucking coil may affect the response of a main receiver would be helpful when designing an antenna array.

The 2D axial Born response (T. Habashy and B. Anderson, "*Reconciling Differences in Depth of Investigation between 2-Mhz Phase Shift and Attenuation Resistivity Measurements*," SPWLA 32$^{nd}$ Annual Logging Symposium, Midland, Tex., 1991) for a two-coil sonde to a point located at $\rho$, z in a cylindrical coordinate system is given by:

$$g_{zz}(\rho, z, \sigma) = \frac{L}{2} \frac{\rho^3}{r_T^3 r_R^3} (1 - ikr_T)(1 - ikr_R) e^{ik(r_T + r_R)}, \quad (4)$$

where $r_T$ and $r_R$ are, respectively, the distances from the transmitter and the receiver to the spatial point where the function is defined, L is the spacing between the two coils, $k^2 = i\omega\mu\sigma$, $\omega$ is the frequency of the transmitter current, $\mu$ is the magnetic permeability, and $\sigma$ is the formation conductivity. The conductivity measured at a depth z can be expressed (in the low-contrast limit) by the convolution operation:

$$\sigma_a(z) = \int_0^\infty d\rho \int_{-\infty}^\infty dz' g(\rho, z - z', \sigma) \sigma(\rho, z'). \quad (5)$$

If the function above is integrated over the radius $\rho$, the result is called the vertical response function, given by the expression:

$$g_V(z, \sigma) = \int_0^\infty d\rho g(\rho, z, \sigma), \quad (6)$$

where $g(\rho, z, \sigma)$ is given by Eq. (4). The vertical response function provides an indication of how the tool will perform in resolving layers with different conductivities in the formations.

For a multi-coil array with a single transmitter, one can sum and weight the individual coil pairs so that $$g_M = \frac{\sum_i \left(\frac{TR_i}{L_i} g_i\right)}{\sum_i \left(\frac{TR_i}{L_i}\right)}, \quad (7)$$

where $g_i$ is either the 2D or the integrated response function (Eq. 4 or Eq. 6) for the i-th receiver, and $g_M$ is the multi-coil function.

Figure 6A:
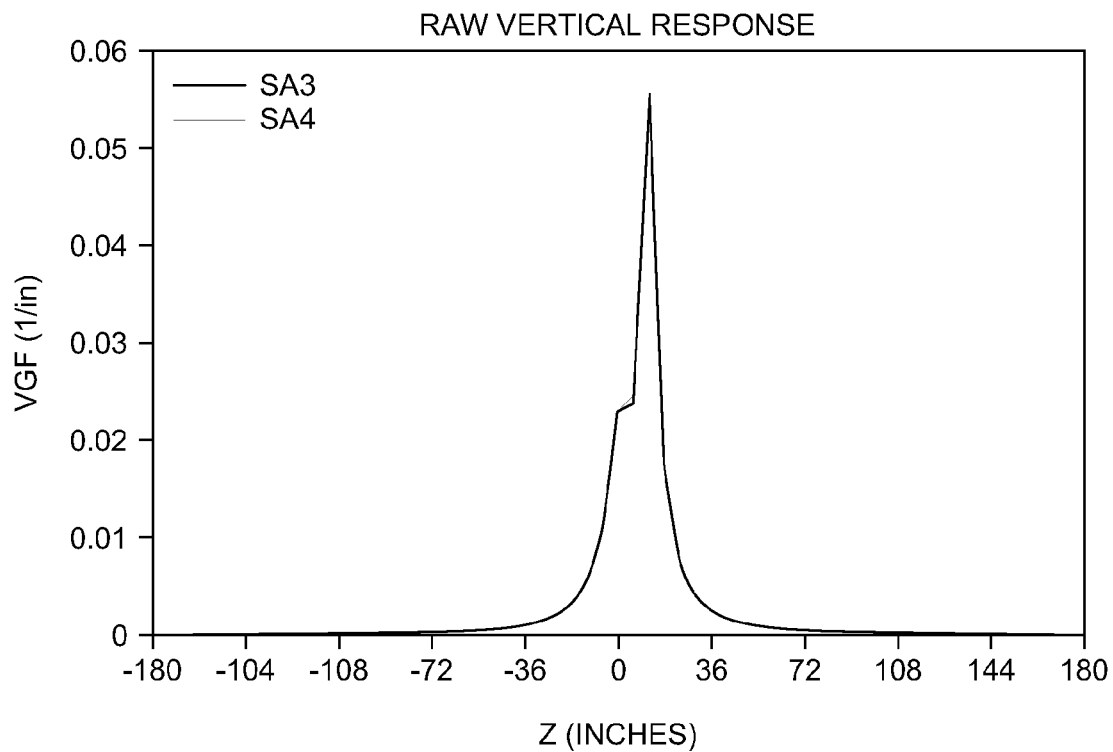
FIGS. 6A-6C illustrate raw data of the 3-coil and the 4-coil responses for the SA, the MA, and the DA in accordance with one embodiment of the invention.
Figure 6B:
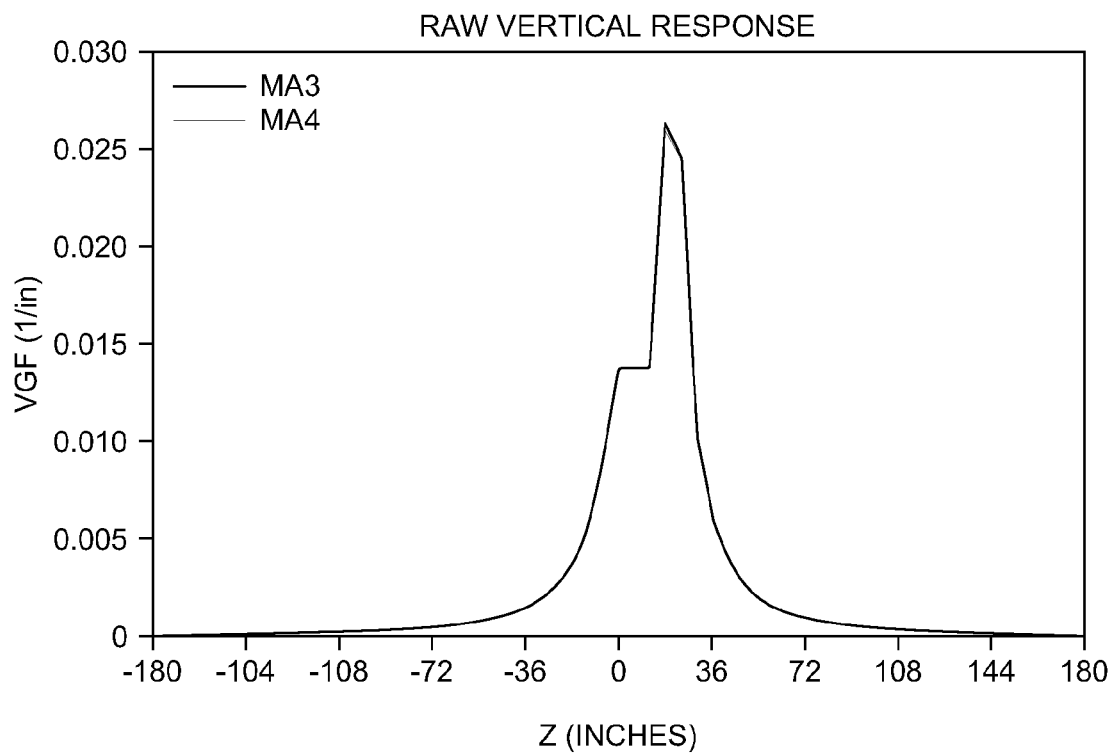
Figure 6C:
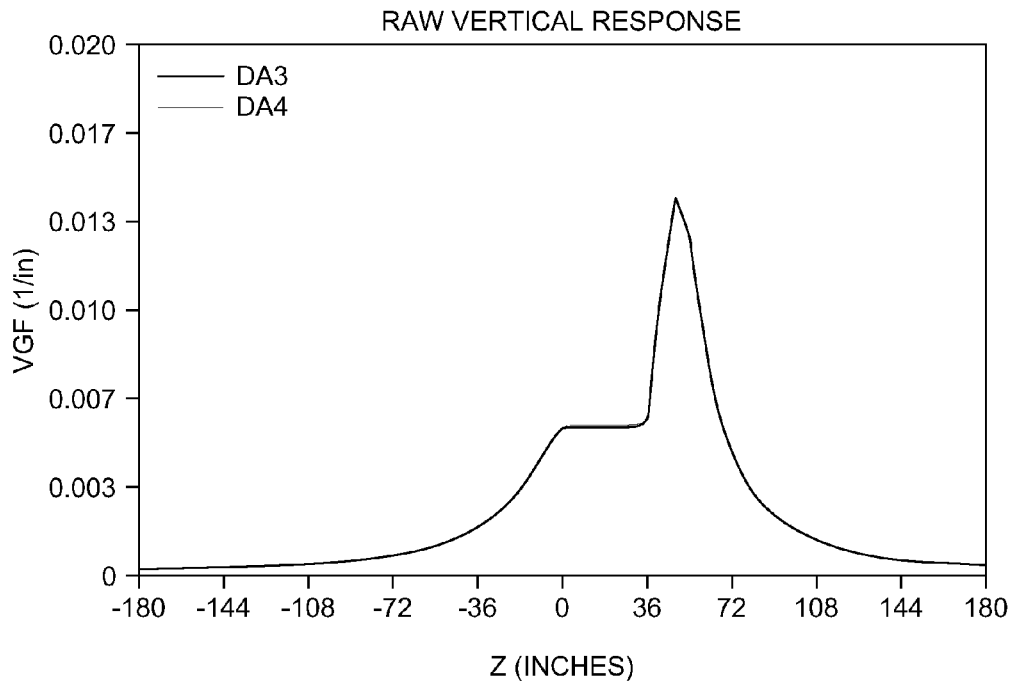

Vertical response functions for a conventional 3-coil array and a 4-coil array in accordance with one embodiment of the invention are compared in FIGS. 6A-6F. FIGS. 6A, 6B, and 6C show the raw data of the 3-coil responses and the 4-coil responses for the shallow (SA3 and SA4), medium (MA3 and MA4), and deep (DA3 and DA4) arrays, respectively. In this example, the trim-to-main ratios of the numbers of turns, $N_{trim}/N_{main}$, were take as 0.25 for the SA (this represents the worst-case scenario), 0.05 for the MA, and 0.02 for the DA. It is clear from FIGS. 6A-6C that the differences in vertical response for the 3-coil and the 4-coil arrays are very small, suggesting that the extra bucking coil does not adversely impact the vertical resolution of the array.

Figure 6D:
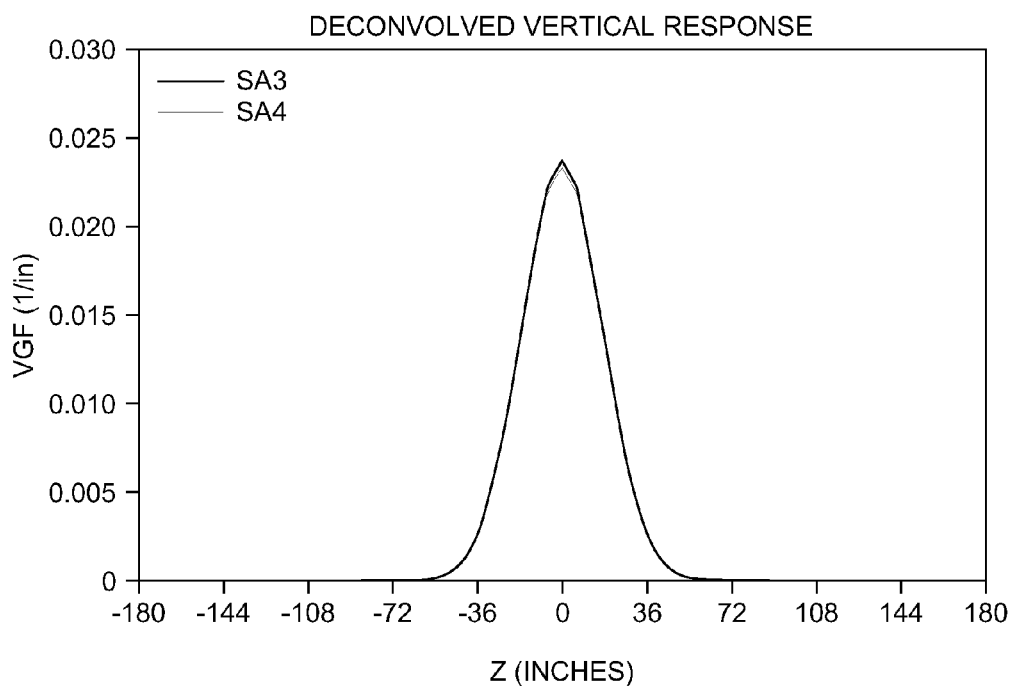
FIGS. 6D-6F illustrate de-convolved data of the 3-coil and the 4-coil responses for the SA, the MA, and the DA in accordance with one embodiment of the invention.
Figure 6E:
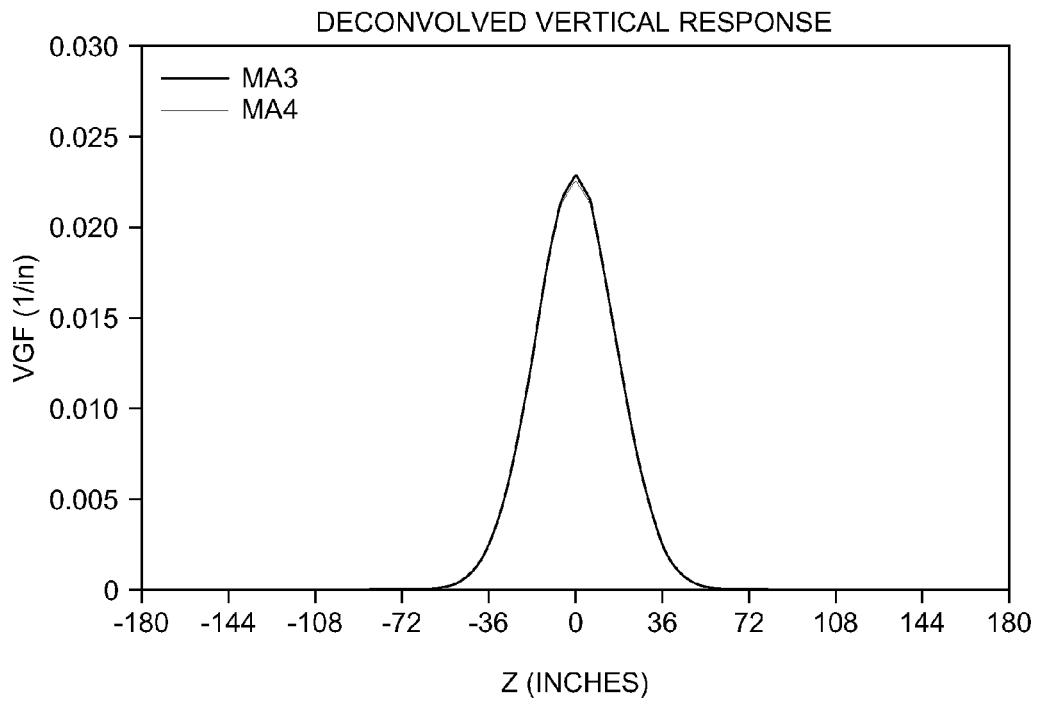
Figure 6F:
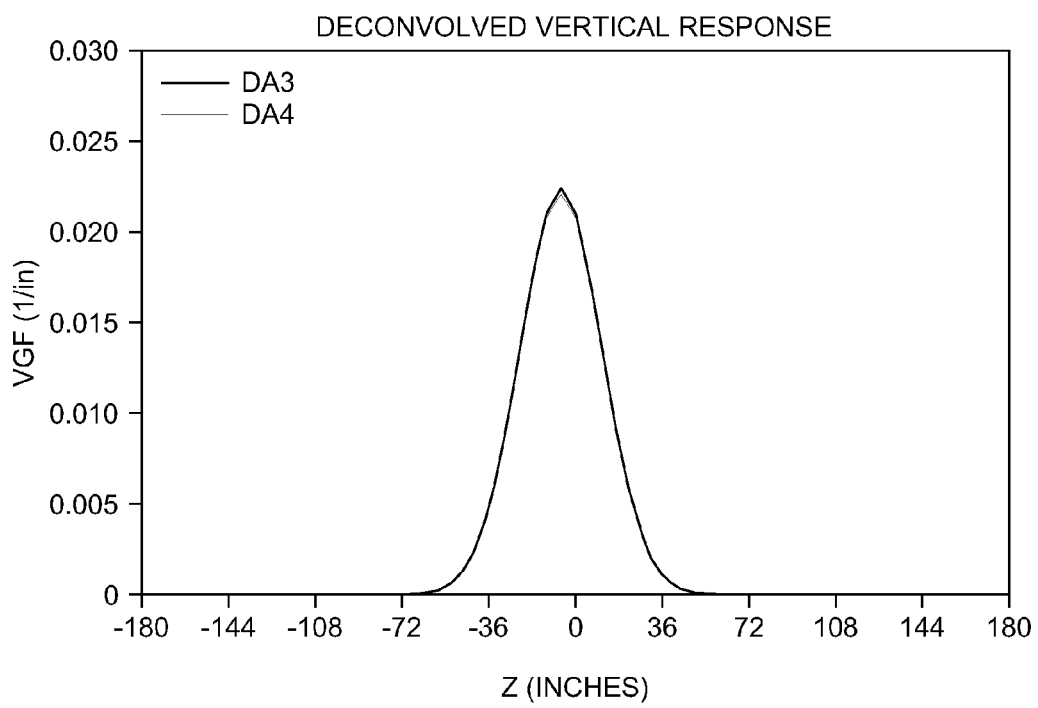

FIGS. 6D-6F show the deconvolved responses for the same arrays (the 4-ft resolution response). Again, the differences between the 3-coil and 4-coil responses are very small, suggesting that the 4-coil design in accordance with embodiments of the invention would produce acceptable measurements, while providing better controllability in reducing $\sigma_X$, as compared with the 3-coil configuration.

In addition to preserving vertical resolution of the tools, the extra bucking coil should have no or little impact on the accuracy of the tool readings and should have similar tolerance for wellbore irregularities. This has been found to be the case. Mutual coupling balancing using an extra bucking coil, in accordance with embodiments of the invention, has been found to produce acceptable results for a reasonable range of the number of turns of coils in the extra bucking coil with respect to vertical resolution, log accuracy, shoulder bed response, and well irregularities.

As noted above, it is preferred that the extra bucking coils be located with a larger spacing from the transmitter than the main receiver is. A typical induction tools has multiple arrays. Therefore, the locations for designing the extra bucking coils are not without limitation. Positioning an extra bucking coil in each array becomes a matter of finding locations along the tool axis that would not interfere with other components such as coils, pressure bulkheads, sensor electrodes, and yet can meet the requirements discussed above.

The induction array and resistivity sensor designs of existing tools (such as the Array Induction Tool provided under the trade name of AIT® and Dual Induction Tool sold under the trade name of DIT® by Schlumberger) permit several locations for the placement of the extra bucking coils. Examples of where an extra bucking coil may be located in a 3-array tool are shown in Table 3 and illustrated graphically in FIG. 7. In Table 3, the position ranges are given from the corresponding main receiver coils, and the sensitivity is measured by the amount of $\sigma_X$ contributed by one turn of the extra bucking coil.

TABLE 3

Locations of the extra coil for each array; the position is from center of the corresponding main coil.

| Array | Position Range (in) | Coil Position (in) | Sensitivity (mS/m/turn) |
|---|---|---|---|
| SA (shallow) | 3.6-5.1 | 4.8 | 250 |
| MA (medium) | 7.9-9.4 | 8.5 | 75 |
| DA (deep) | 4.9-8.1 | 6.2 | 15 |

Figure 7:
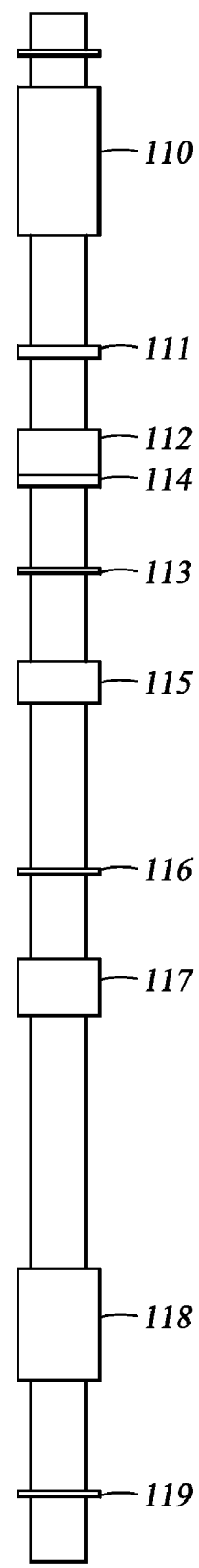
FIG. 7 illustrates positions of the extra coil for each of the induction arrays in accordance with one embodiment of the invention.

FIG. 7 shows the positions of the extra bucking coils in the SA, the MA, and the DA in accordance an embodiment of the present invention. For the SA, the bucking coil 111 is located between the transmitter 110 and the main receiver coil 112. The extra bucking coil 113 is located further away from the transmitter 110 than is the main receiver coil 112. For the MA, the bucking coil 114 is optionally located near the main receiver coil 112 of the SA, and is located between the transmitter 110 and the main receiver coil 115 for the MA. The extra bucking coil 116 for the MA is further away than the main receiver coil 115 for the MA. For the DA, the main receiver coil 118 is located between the bucking coil 117 and the extra bucking coil 119.

Figure 8:
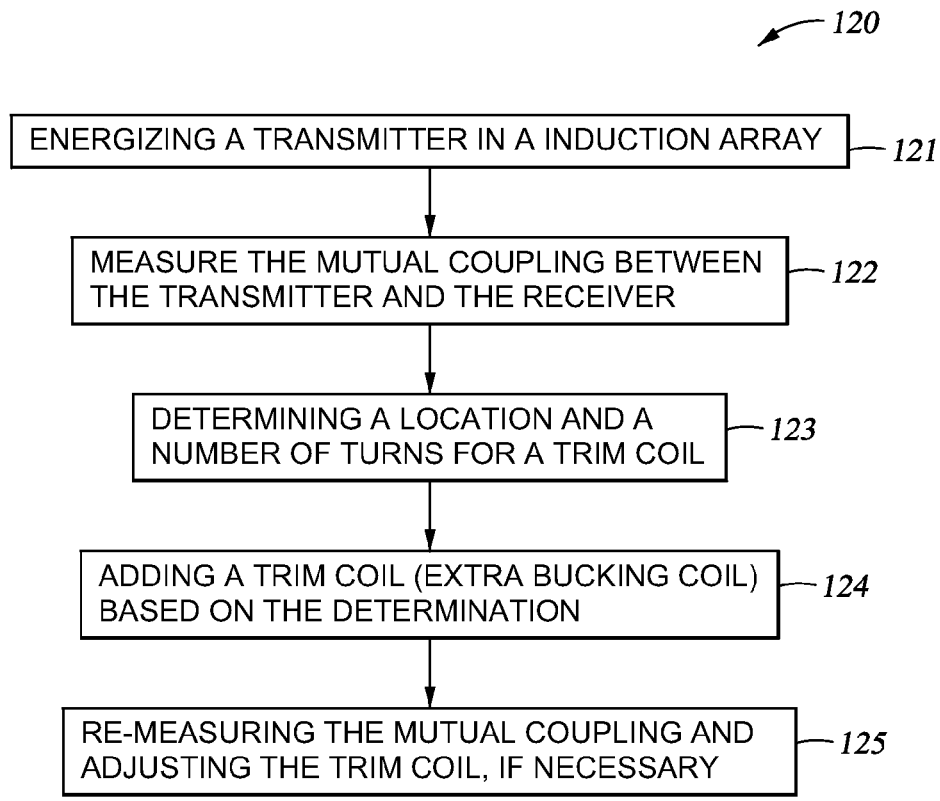
FIG. 8 shows a method for balancing an induction array in accordance with one embodiment of the present invention.

FIG. 8 shows a method of balancing an induction array in accordance with one embodiment of the invention. As shown, a transmitter in an induction array is energized with an alternating current (step 121) and a mutual coupling between the transmitter and the receiver is measured (step 122). Based on the measured mutual coupling, one can determine a good location and a number of turns for an extra bucking coil (a trim coil) that can be used to minimize the mutual coupling (step 123), as reflected in the imaginary signal portion of the phasor voltage signal detected by the receiver. Then, an extra bucking coil is added to the array (step 124) to further balance the array. If necessary, the mutual coupling can be re-determined and any further adjustment of the extra bucking coil may be performed (step 125). In accordance with embodiments of the invention, it is desirable that the mutual coupling (as reflected in $\sigma_x$) in an array is as small as possible or below a tolerance (or criterion). The selected criterion may be based on the magnitudes of the imaginary signals ($\sigma_x$) as compared with the real signals in phasor voltage signals detected by a receiver, taking into account the array tolerance ($\Delta\sigma_R$), which are different for different arrays. If the wrong-phase rejection factor is W (in the contemporary electronics, it can be as high as 100 or 200), the criterion would read $|\sigma_x/\Delta\sigma_R|<W$.

The above description illustrates embodiments of the invention using an extra bucking coil for balancing an induction array. One of ordinary skill in the art would appreciate that embodiments of the invention may be used with a wide range of tools, including wireline tools, LWD, MWD, and LWT tools. In addition, such tools may also include one or more conventional three-coil arrays and/or one or more electrodes, such as those used in conventional conductivity/resistivity tools.

Advantages of the present invention include one or more of the following. Extra bucking coils can provide better controlled balancing of the arrays. Induction tools of the invention are better balanced to have much smaller $\sigma_x$ signals, which will be more tolerant of variations in environmental factors that may cause mismatches of the bucking coils. Induction tools of the invention have similar performance characteristics in terms of vertical resolutions, accuracy of resistivity measurements, and responses various features in the boreholes (shoulder bed effects, cave effects, etc.).

What is claimed is:

1. A method, comprising:
    calculating a first mutual coupling between a transmitter of an induction array and a receiver of the induction array in the absence of a first bucking coil of the induction array and in the absence of a second bucking coil of the induction array;
    configuring the first bucking coil to eliminate the first mutual coupling;
    applying an alternating current to the transmitter in the presence of the first bucking coil and in the absence of the second bucking coil;
    measuring a second mutual coupling between the transmitter and the receiver in the presence of the first bucking coil and in the absence of the second bucking coil; and
    configuring the second bucking coil to eliminate the second mutual coupling;
    wherein the receiver is disposed between the transmitter and the second bucking coil;
    wherein the first bucking coil is disposed between the transmitter and the receiver;
    wherein configuring the second bucking coil eliminates mutual coupling between the transmitter and receiver not eliminated by the first bucking coil but existing as a result of manufacturing tolerances;
    wherein configuring the second bucking coil comprises configuring a location of the second bucking coil based on a magnitude of the measured second mutual coupling; and
    wherein configuring the second bucking coil comprises configuring a number of turns of the second bucking coil based on a magnitude of the measured second mutual coupling.

2. The method of claim 1 wherein the induction array is part of a wireline tool.

3. The method of claim 1 wherein the induction array is part of a logging-while-drill tool.

4. The method of claim 1 wherein the induction array is part of a measurement-while-drilling tool.

5. The method of claim 1 wherein the induction array is part of a logging-while-tripping tool.

6. A method, comprising:
    calculating a first mutual coupling between a transmitter of an induction array and a receiver of the induction array in the absence of a first bucking coil of the induction array and in the absence of a second bucking coil of the induction array;
    configuring the first bucking coil to eliminate the first mutual coupling;

applying an alternating current to the transmitter in the presence of the first bucking coil and in the absence of the second bucking coil;

measuring a second mutual coupling between the transmitter and the receiver in the presence of the first bucking coil and in the absence of the second bucking coil; and configuring the second bucking coil to eliminate the second mutual coupling.

7. The method of claim 6 wherein the receiver is disposed between the transmitter and the second bucking coil, and wherein the first bucking coil is disposed between the transmitter and the receiver.

8. The method of claim 6 wherein configuring the second bucking coil eliminates mutual coupling between the transmitter and receiver not eliminated by the first bucking coil but existing as a result of manufacturing tolerances.

9. The method of claim 6 wherein configuring the second bucking coil comprises configuring a location of the second bucking coil based on a magnitude of the measured second mutual coupling.

10. The method of claim 6 wherein configuring the second bucking coil comprises configuring a number of turns of the second bucking coil based on a magnitude of the measured second mutual coupling.

11. The method of claim 6 wherein the induction array is part of a wireline tool.

12. The method of claim 6 wherein the induction array is part of a logging-while-drill tool.

13. The method of claim 6 wherein the induction array is part of a measurement-while-drilling tool.

14. The method of claim 6 wherein the induction array is part of a logging-while-tripping tool.

* * * * *